(12) United States Patent
Habraken

(10) Patent No.: US 11,508,001 B2
(45) Date of Patent: Nov. 22, 2022

(54) DYNAMIC CHECKOUT PAGE OPTIMIZATION USING MACHINE-LEARNED MODEL

(71) Applicant: Stripe, Inc., San Francisco, CA (US)

(72) Inventor: Jeroen Antonius Egidius Habraken, Mountain View, CA (US)

(73) Assignee: Stripe, Inc., San Francisco, CA (US)

( * ) Notice: Subject to any disclaimer, the term of this patent is extended or adjusted under 35 U.S.C. 154(b) by 678 days.

(21) Appl. No.: 16/274,043

(22) Filed: Feb. 12, 2019

(65) Prior Publication Data
US 2020/0258141 A1 Aug. 13, 2020

(51) Int. Cl.
*G06Q 30/06* (2012.01)
*G06F 16/957* (2019.01)
*G06N 20/00* (2019.01)
*G06K 9/62* (2022.01)

(52) U.S. Cl.
CPC ....... *G06Q 30/0641* (2013.01); *G06F 16/957* (2019.01); *G06K 9/6256* (2013.01); *G06N 20/00* (2019.01); *G06Q 30/0633* (2013.01)

(58) Field of Classification Search
CPC .... G06F 16/957; G06K 9/6256; G06N 20/00; G06Q 30/06–0645; G06Q 30/08; G06Q 50/01; G16Y 10/00–90
See application file for complete search history.

(56) References Cited

U.S. PATENT DOCUMENTS

| | | | |
|---|---|---|---|
| 9,754,278 B2* | 9/2017 | King | G06Q 30/0238 |
| 11,348,163 B1* | 5/2022 | Sharma | G06Q 30/0641 |
| 2014/0040010 A1* | 2/2014 | Garcia-Martinez | G06Q 50/01 705/14.43 |
| 2014/0201038 A1* | 7/2014 | Minnis | G06Q 30/0641 715/234 |
| 2015/0095756 A1* | 4/2015 | Aganovic | G06F 40/131 715/234 |
| 2016/0171514 A1* | 6/2016 | Frank | G06Q 30/02 705/7.29 |
| 2016/0239867 A1* | 8/2016 | Sinha | G06Q 30/0255 |

OTHER PUBLICATIONS

Perlich, "Machine learning for targeted display advertising: transfer learning in action," Springer, Mach Learn (2014) 95:103-127 (Published online: May 30, 2013). (Year: 2013).*

* cited by examiner

*Primary Examiner* — Adam L Levine
(74) *Attorney, Agent, or Firm* — Schwegman Lundberg & Woessner, P.A.

(57) ABSTRACT

In an example embodiment, a method for processing payments made via an electronic payment processing system is provided. An example method includes obtaining training data from a data source. The training data relates to prior purchases made via the electronic payment processing system, wherein the data source includes, in some examples, only a checkout page in a purchase transaction funnel. Features associated with a negative user action in relation to prior purchases are identified. A machine learning algorithm produces a dynamic transactional behavior score indicative of a probability that a purchase will invoke a negative user action.

20 Claims, 7 Drawing Sheets

US 11,508,001 B2

DYNAMIC CHECKOUT PAGE OPTIMIZATION USING MACHINE-LEARNED MODEL

TECHNICAL FIELD

The subject matter disclosed herein generally relates to the technical field of special-purpose machines that facilitate adding new features to a payment processor or payment device. The subject matter also relates to an improved payment processor that implements such new features and includes software-configured computerized variants of such special-purpose machines and improvements to such variants, and to the technologies by which such special-purpose machines become improved compared to other special-purpose machines that facilitate adding the new features.

Aspects of the present disclosure use data signals uniquely observable from a checkout page of a purchase transaction funnel to make inferences about a customer's experience in the transaction. In one aspect, an improved payment processor can dynamically optimize a checkout page using a machine-learned model.

BACKGROUND

The present subject matter seeks to address technical problems existing in conventional payment processors and systems. For example, a service provider may seek to improve a technical service or user interface but may lack or be denied access to sufficient data to implement analysis and change. As one example, a payment processor may be driven to provide world-class online payment services but may only be allowed a transactional presence by an online merchant as the very last step in a purchase transaction funnel. In typical arrangements, the very last page is a checkout page, and data can generally only be sourced from this page.

Thus, the requisite data that might otherwise allow an informed analysis of a user experience is limited in such conventional arrangements. This technical shortcoming can present a significant challenge to the continued development of online payment services or other technical services.

Moreover, although a customer may ultimately make a purchase, not all purchases are made with a positive mindset. That is, a customer may make a purchase but nevertheless be frustrated, upset, or uncertain about the purchase just made. A present technical inability to detect a customer mindset based on data sourced from a checkout page can result in compromised transactional results and system inefficiency. A comprised system can lead to a significant waste of technical resources and technical inefficiency. Other drawbacks can include increases in purchase returns, chargebacks, loss of future or recurring business, and the like.

BRIEF DESCRIPTION OF THE DRAWINGS

Some embodiments are illustrated by way of example and not limitation in the figures of the accompanying drawings.

DETAILED DESCRIPTION

Figure 1:
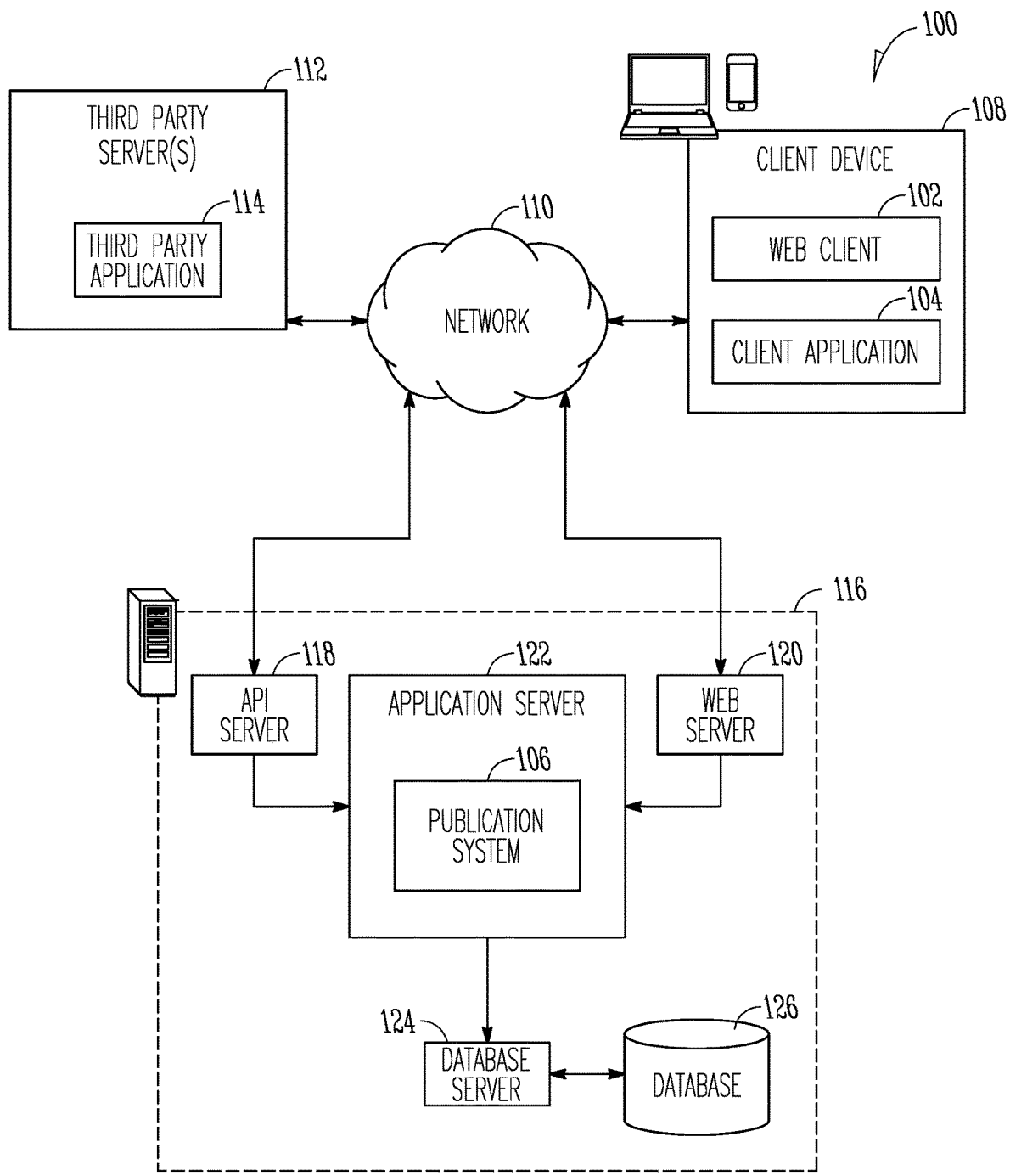
FIG. 1 is a block diagram illustrating a high-level network architecture, according to an example embodiment.

"Carrier Signal" in this context refers to any intangible medium that is capable of storing encoding or carrying instructions for execution by a machine, and includes digital or analog communication signals or other intangible media to facilitate communication of such instructions. Instructions may be transmitted or received over a network using a transmission medium via a network interface device and using any one of a number of well-known transfer protocols.

"Client Device" or "Electronic Device" in this context refers to any machine that interfaces to a communications network to obtain resources from one or more server systems or other client devices. A client device may be, but is not limited to, a mobile phone, desktop computer, laptop, portable digital assistant (PDA), smart phone, tablet, ultrabook, netbook, laptop, multi-processor system, microprocessor-based or programmable consumer electronic system, game console, set-top box, or any other communication device that a user may use to access a network.

"Customer's Electronic Device" or "Electronic User Device" in this context refers to a client device that a customer uses to interact with a merchant. Examples of this device include a desktop computer, a laptop computer, a mobile device (e.g., smart phone, tablet), and a game console. The customer's electronic device may interact with the merchant via a browser application that executes on the customer's electronic device or via a native app installed onto the customer's electronic device. The client-side application executes on the customer's electronic device.

"Communications Network" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network, and coupling may be a Code Division Multiple Access (CDMA) connection, a Global System for Mobile communications (GSM) connection, or another type of cellular or wireless coupling In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"Component" in this context refers to a device, physical entity, or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no loner general-purpose processors.

It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instant in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instant of time and to constitute a different hardware component at a different instant of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a singe machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Machine-Readable Medium" in this context refers to a component, device, or other tangible medium able to store instructions and data temporarily or permanently and may include, but not be limited to, random-access memory (RAM), read-only memory (ROM), buffer memory, flash memory, optical media, magnetic media, cache memory, other types of storage (e.g., Erasable Programmable Read-Only Memory (EPROM)), and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"Processor" in one context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), or any combination thereof. A processor may further be a multi-core processor having two or more independent processors (sometimes referred to as "cores") that may execute instructions contemporaneously.

In another context, a "Processor" (e.g., a processor 540 in FIG. 5) is a company (often a third party) appointed to handle payment card (e.g., credit card, debit card) transactions. They have connections to various card networks and supply authorization and settlement services to merchants or payment service providers. In aspects, they can also move the money from an issuing bank to a merchant or acquiring bank.

"Card Network" (or "Card Association") in this context refers to financial payment networks such as Visa®, MasterCard®, American Express®, Diners Club®, JCB®, and China Union-Pay®.

"Acquiring Bank" or "Acquirer" in this context refers to a bank or financial institution that accepts credit and/or debit card payments from affiliated card networks for products or services on behalf of a merchant or payment service provider.

"Card Issuing Bank" or "Issuing Bank" in this context refers to a bank that offers card network or association-branded payment cards directly to consumers. An issuing bank assumes primary liability for the consumer's capacity to pay off debts they incur with their card.

"Payment Information" includes information generally required to complete a transaction, and the specific type of information provided may vary by payment type. Some payment information will be sensitive (e.g., the card validation code), while other information might not be (e.g., a zip code). For example, when a payment is made via a credit card or debit card, the payment information includes a primary account number (PAN) or credit card number, card validation code, and expiration month and year. In another payment example, made using an Automated Clearinghouse (ACH) transaction for example, the payment information includes a bank routing number and an account number within that bank.

"Sensitive information" may not necessarily be related to payment information and may include other confidential personal information, such as medical (e.g., HIPAA) information, for example. The ambit of the term "Payment Information" includes "Sensitive Information" within its scope. In some examples, sensitive payment information may include "regulated payment information," which may change over time. For example, currently a merchant cannot collect more than the first six (6) or the last four (4) numbers of a customer's PAN without generally needing to comply with Payment Card Industry (PCI) regulations. But card number lengths may change, and when they do, the "6 and 4" rules will likely change with them. These potential future changes are incorporated within the ambit of "regulated payment information," which is, in turn, included within the ambit of the term "payment information" as defined herein.

"Merchant" in this context refers to an entity that is associated with selling or licensing products and/or services over electronic systems such as the Internet and other computer networks. The merchant may be the direct seller/licensor, or the merchant may be an agent for a direct seller/licensor. For example, entities such as Amazon® sometimes act as the direct seller/licensor, and sometimes act as an agent for a direct seller/licensor.

"Merchant Site" in this context refers to an e-commerce site or portal (e.g., website, or mobile app) of the merchant. In some embodiments, the merchant (e.g., a merchant 510 of FIG. 5) and merchant servers (e.g., merchant servers 512 of FIG. 5) are associated with the merchant site. The merchant site is associated with a client-side application and a server-side application. In one example embodiment, the merchant site includes the merchant servers 512 of FIG. 5, and the server-side application executes on the merchant servers 512.

"Payment Processor" in this context (e.g., a payment processor 530 in FIG. 5) refers to an entity or a plurality of entities that facilitate a transaction, for example between a merchant and a customer's electronic device. With reference to a high-level description illustrated in FIG. 5, in some examples described more fully below, the payment processor includes selected functionality of both the payment processor 530 and the processor 540/card networks 550. For example, the payment processor 530 creates tokens and maintains and verifies publishable (non-secret) keys and secret keys. In the illustrated example, the processor 540/card networks 550 are involved in authorizing or validating payment information. In one example embodiment, the payment processor 530 and the processor 540/card networks 550 function together to authorize and validate payment information, issue a token, and settle any charges that are made. Accordingly, in this embodiment, "payment processor" refers to the functionality of the payment processor 530 and the functionality of the processor 540/card networks 550. In another example embodiment, wherein step (3) in the high-level description is not performed, and the payment processor 530 performs its own verification before issuing a token, the processor 540/card networks 550 are still used for settling any charges that are made, as described in step (7). Accordingly, in this embodiment, "payment processor" may refer only to the functionality of the payment processor 530 with respect to issuing tokens. Further, in the example arrangement shown, the payment processor 530, the processor 540, and the card networks 550 are shown as separate entities. In some examples, their respective functions may be performed by two entities, or even just one entity, with the entities themselves being configured accordingly.

"Native Application" or "native app" in this context refers to an app commonly used with a mobile device, such as a smart phone or tablet. When used with a mobile device, the native app is installed directly onto the mobile device. Mobile device users typically obtain these apps through an online store or marketplace, such as an app store (e.g., Apple's App Store, Google Play store). More generically, a native application is designed to run in the computer environment (machine language and operating system) that it is being run in. It can be referred to as a "locally installed application." A native application differs from an interpreted application, such as a Java applet, which may require interpreter software. A native application also differs from an emulated application that is written for a different platform and converted in real time to run, and a web application that is run within the browser.

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright 2011-2018, Stripe, Inc., All Rights Reserved.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

With reference to FIG. 1, an example embodiment of a high-level SaaS network architecture 100 is shown. A networked system 116 provides server-side functionality via a network 110 (e.g., the Internet or a WAN) to a client device 108. A web client 102 and a programmatic client, in the example form of a client application 104, are hosted and execute on the client device 108. The networked system 116 includes an application server 122, which in turn hosts a publication system 106 (such as the publication system hosted at https://stripe.com by Stripe, Inc. of San Francisco, Calif. (herein "Stripe") as an example of a payment processor 530) that provides a number of functions and services to the client application 104 that accesses the networked system 116. The client application 104 also provides a number of interfaces described herein, which can present an output in accordance with the methods described herein to a user of the client device 108.

The client device 108 enables a user to access and interact with the networked system 116 and, ultimately, the publication system 106. For instance, the user provides input (e.g., touch screen input or alphanumeric input) to the client device 108, and the input is communicated to the networked system 116 via the network 110. In this instance, the networked system 116, in response to receiving the input from the user, communicates information back to the client device 108 via the network 110 to be presented to the user.

An API server 118 and a web server 120 are coupled, and provide programmatic and web interfaces respectively, to the application server 122. The application server 122 hosts the publication system 106, which includes components or applications described further below. The application server 122 is, in turn, shown to be coupled to a database server 124 that facilitates access to information storage repositories (e.g., a database 126). In an example embodiment, the database 126 includes storage devices that store information accessed and generated by the publication system 106.

Additionally, a third-party application 114, executing on one or more third-party servers 112, is shown as having programmatic access to the networked system 116 via the programmatic interface provided by the API server 118. For example, the third-party application 114, using information retrieved from the networked system 116, may support one or more features or functions on a website hosted by a third party.

Turning now specifically to the applications hosted by the client device 108, the web client 102 may access the various systems (e.g., the publication system 106) via the web interface supported by the web server 120. Similarly, the client application 104 (e.g., an "app" such as a payment processor app) accesses the various services and functions provided by the publication system 106 via the programmatic interface provided by the API server 118. The client application 104 may be, for example, an "app" executing on the client device 108, such as an iOS or Android OS application to enable a user to access and input data on the networked system 116 in an offline manner and to perform batch-mode communications between the client application 104 and the networked system 116.

Further, while the SaaS network architecture 100 shown in FIG. 1 employs a client-server architecture, the present inventive subject matter is of course not limited to such an architecture, and could equally well find application in a distributed, or peer-to-peer, architecture system, for example. The publication system 106 could also be implemented as a standalone software program, which does not necessarily have networking capabilities.

Figure 2:
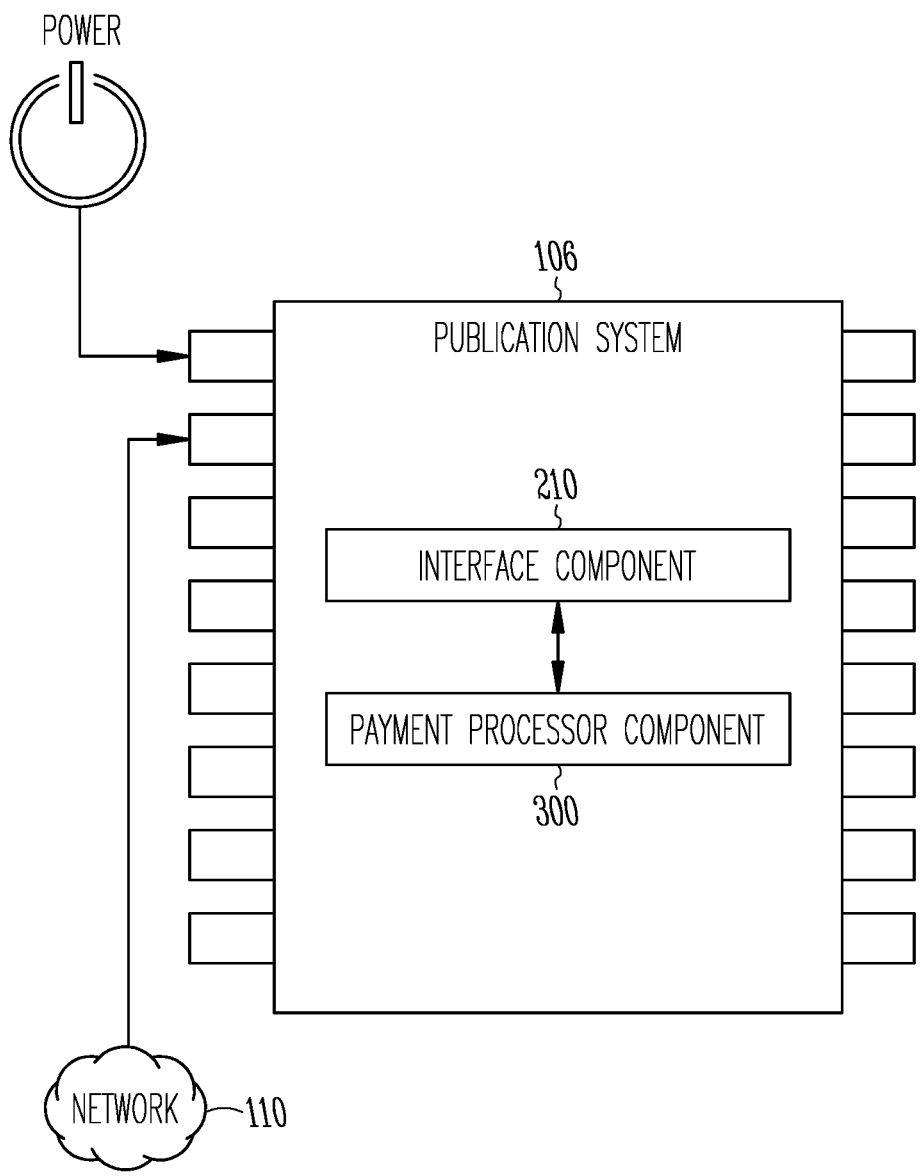
FIG. 2 is a block diagram showing architectural aspects of a publication system, according to some example embodiments.

FIG. 2 is a block diagram showing architectural details of a publication system 106, according to some example embodiments. Specifically, the publication system 106 is shown to include an interface component 210 by which the publication system 106 communicates (e.g., over a network 110) with other systems within the SaaS network architecture 100.

The interface component 210 is communicatively coupled to a payment processor component 300 that operates to provide payment processing functions for a payment processor (e.g., a payment processor 530, FIG. 5) in accordance with the methods described herein with reference to the accompanying drawings.

Figure 3:
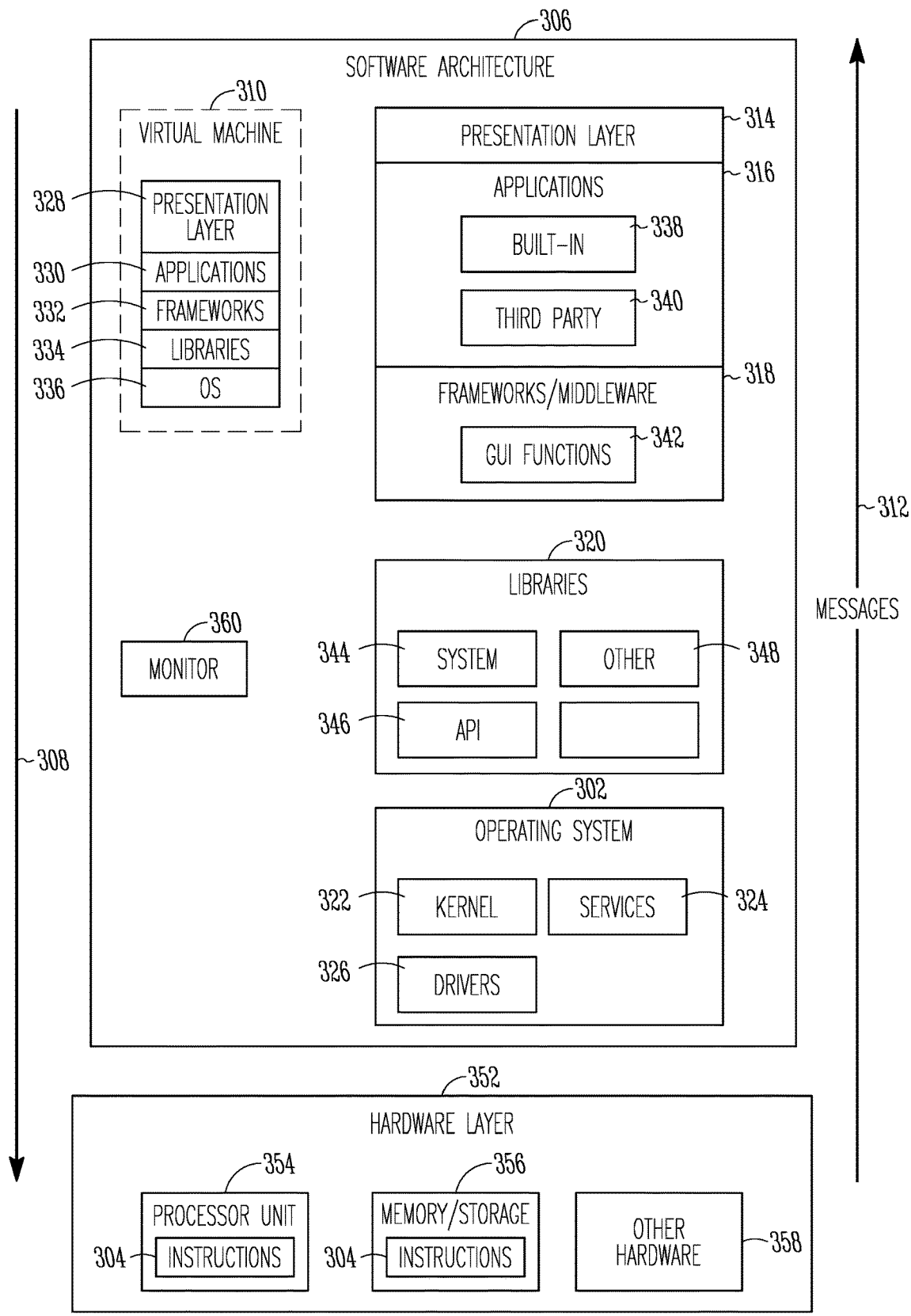
FIG. 3 is a block diagram illustrating a representative software architecture, which may be used in conjunction with various hardware architectures herein described.

FIG. 3 is a block diagram illustrating an example software architecture 306, which may be used in conjunction with various hardware architectures herein described. FIG. 3 is a non-limiting example of a software architecture 306, and it will be appreciated that many other architectures may be implemented to facilitate the functionality described herein. The software architecture 306 may execute on hardware such as a machine 400 of FIG. 4 that includes, among other things, processors 404, memory/storage 406, and input/output (I/O) components 418. A representative hardware layer 352 is illustrated and can represent, for example, the machine 400 of FIG. 4. The representative hardware layer 352 includes a processor 354 having associated executable instructions 304. The executable instructions 304 represent the executable instructions of the software architecture 306, including implementation of the methods, components, and so forth described herein. The hardware layer 352 also includes memory and/or storage modules as memory/storage 356, which also have the executable instructions 304. The hardware layer 352 may also comprise other hardware 358.

In the example architecture of FIG. 3, the software architecture 306 may be conceptualized as a stack of layers where each layer provides particular functionality. For example, the software architecture 306 may include layers such as an operating system 302, libraries 320, frameworks/middleware 318, applications 316, and a presentation layer 314. Operationally, the applications 316 and/or other components within the layers may invoke API calls 308 through the software stack and receive a response as messages 312 in response to the API calls 308. The layers illustrated are representative in nature, and not all software architectures have all layers. For example, some mobile or special-purpose operating systems may not provide a frameworks/middleware 318, while others may provide such a layer. Other software architectures may include additional or different layers.

The operating system 302 may manage hardware resources and provide common services. The operating system 302 may include, for example, a kernel 322, services 324, and drivers 326. The kernel 322 may act as an abstraction layer between the hardware and the other software layers. For example, the kernel 322 may be responsible for memory management, processor management (e.g., scheduling), component management, networking security setting, and so on. The services 324 may provide other common services for the other software layers. The drivers 326 are responsible for controlling or interfacing with the underlying hardware. For instance, the drivers 326 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 320 provide a common infrastructure that is used by the applications 316 and/or other components and/or layers. The libraries 320 provide functionality that allows other software components to perform tasks in an easier fashion than by interfacing directly with the underlying operating system 302 functionality (e.g., kernel 322, services 324, and/or drivers 326). The libraries 320 may include system libraries 344 (e.g., C standard library) that may provide functions such as memory allocation functions, string manipulation functions, mathematical functions, and the like. In addition, the libraries 320 may include API libraries 346 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 320 may also include a wide variety of other libraries 348 to provide many other APIs to the applications 316 and other software components/modules.

The frameworks/middleware 318 provide a higher-level common infrastructure that may be used by the applications 316 and/or other software components/modules. For example, the frameworks/middleware 318 may provide various graphic user interface (GUI) functions 342, high-level resource management, high-level location services, and so forth. The frameworks/middleware 318 may provide a broad spectrum of other APIs that may be utilized by the applications 316 and/or other software components/modules, some of which may be specific to a particular operating system or platform.

The applications 316 include built-in applications 338 and/or third-party applications 340. Examples of representative built-in applications 338 may include, but are not limited to, a contacts application, a browser application, a book reader application, a location application, a media application, a messaging application, and/or a game application. The third-party applications 340 may include any application developed using the ANDROID™ or IOS™ software development kit (SDK) by an entity other than the vendor of the particular platform and may be mobile software running on a mobile operating system such as IOS™, ANDROID™, WINDOWS® Phone, or other mobile operating systems. The third-party applications 340 may invoke the API calls 308 provided by the mobile operating system (such as the operating system 302) to facilitate functionality described herein.

The applications 316 may use built-in operating system functions (e.g., kernel 322, services 324, and/or drivers 326), libraries 320, and frameworks/middleware 318 to create user interfaces to interact with users of the system. Alternatively, or additionally, in some systems, interactions with a user may occur through a presentation layer, such as the presentation layer 314. In these systems, the application/component "logic" can be separated from the aspects of the application/component that interact with a user.

Some software architectures use virtual machines. In the example of FIG. 3, this is illustrated by a virtual machine 310. The virtual machine 310 creates a software environment where applications/components can execute as if they were executing on a hardware machine (such as the machine 400 of FIG. 4, for example). The virtual machine 310 is hosted by a host operating system (e.g., the operating system 302 in FIG. 3) and typically, although not always, has a virtual machine monitor 360, which manages the operation of the virtual machine 310 as well as the interface with the host operating system (e.g., the operating system 302). A software architecture executes within the virtual machine 310 such as an operating system (OS) 336, libraries 334, frameworks 332, applications 330, and/or a presentation layer 328. These layers of software architecture executing within the virtual machine 310 can be the same as corresponding layers previously described or may be different.

Figure 4:
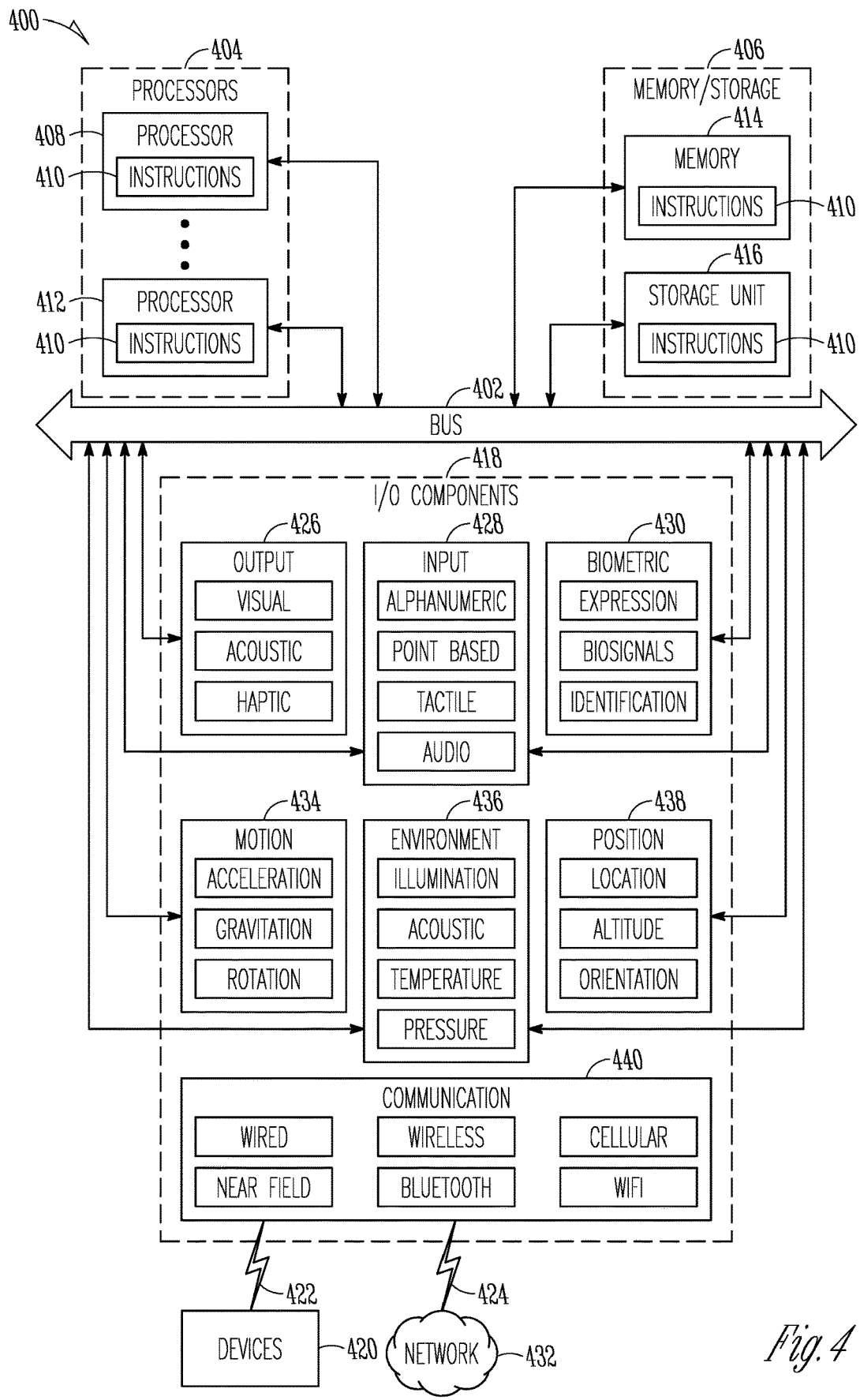
FIG. 4 is a block diagram illustrating components of a machine, according to some example embodiments, able to read instructions from a machine-readable medium (e.g., a machine-readable storage medium) and perform any one or more of the methodologies discussed herein.

FIG. 4 is a block diagram illustrating components of a machine 400, according to some example embodiments, able to read instructions from a machine-readable medium (e.g., a machine-readable storage medium) and perform any one or more of the methodologies discussed herein. Specifically, FIG. 4 shows a diagrammatic representation of the machine 400 in the example form of a computer system, within which instructions 410 (e.g., software, a program, an application, an applet, an app, or other executable code) for causing the machine 400 to perform any one or more of the methodologies discussed herein may be executed. As such, the instructions 410 may be used to implement modules or components described herein. The instructions 410 transform the general, non-programmed machine 400 into a particular machine 400 programmed to carry out the described and illustrated functions in the manner described. In alternative embodiments, the machine 400 operates as a standalone device or may be coupled (e.g., networked) to other machines. In a networked deployment, the machine 400 may operate in the capacity of a server machine or a client machine in a server-client network environment, or as a peer machine in a peer-to-peer (or distributed) network environment. The machine 400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 410, sequentially or otherwise, that specify actions to be taken by the machine 400. Further, while only a single machine 400 is illustrated, the term "machine" shall also be taken to include a collection of machines that individually or jointly execute the instructions 410 to perform any one or more of the methodologies discussed herein.

The machine 400 may include processors 404 (including processors 408 and 412), memory/storage 406, and I/O components 418, which may be configured to communicate with each other such as via a bus 402. The memory/storage 406 may include a memory 414, such as a main memory, or other memory storage, and a storage unit 416, both accessible to the processors 404 such as via the bus 402. The storage unit 416 and memory 414 store the instructions 410 embodying any one or more of the methodologies or functions described herein. The instructions 410 may also reside, completely or partially, within the memory 414, within the storage unit 416, within at least one of the processors 404 (e.g., within the processor's cache memory), or any suitable combination thereof, during execution thereof by the machine 400. Accordingly, the memory 414, the storage unit 416, and the memory of the processors 404 are examples of machine-readable media.

The I/O components 418 may include a wide variety of components to receive input, provide output, produce output, transmit information, exchange information, capture measurements, and so on. The specific I/O components 418 that are included in a particular machine will depend on the type of machine. For example, portable machines such as mobile phones will likely include a touch input device or other such input mechanisms, while a headless server machine will likely not include such a touch input device. It will be appreciated that the I/O components 418 may include many other components that are not shown in FIG. 4. The I/O components 418 are grouped according to functionality merely for simplifying the following discussion, and the grouping is in no way limiting In various example embodiments, the I/O components 418 may include output components 426 and input components 428. The output components 426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 418 may include biometric components 430, motion components 434, environment components 436, or position components 438, among a wide array of other components. For example, the biometric components 430 may include components to detect expressions (e.g., hand expressions, facial expressions, vocal expressions, body gestures, or eyetracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 434 may include acceleration sensor components (e.g., accelerometer), gravitation sensor components, rotation sensor components (e.g., gyroscope), and so forth. The environment components 436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 438 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 418 may include communication components 440 operable to couple the machine 400 to a network 432 or devices 420 via a coupling 424 and a coupling 422, respectively. For example, the communication components 440 may include a network interface component or other suitable device to interface with the network 432. In further examples, the communication components 440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 420 may be another machine or any of a wide variety of peripheral devices (e.g., a peripheral device coupled via a USB).

Moreover, the communication components 440 may detect identifiers or include components operable to detect identifiers. For example, the communication components 440 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 440, such as location via Internet Protocol (IP) geo-location, location via Wi-Fi® signal triangulation, location via detecting an NFC beacon signal that may indicate a particular location, and so forth.

In some embodiments, a JavaScript library can be embedded into a merchant's checkout form to handle credit card information. When a user attempts to complete a transaction using the checkout form, it sends the credit card information directly from the user's browser to the payment processor's servers. The JavaScript library provides merchants with a set of technologies that can be easily and quickly integrated to securely accept payments online. With the JavaScript library, merchants retain full control of their customers' payment flows, but their servers are never exposed to sensitive payment information.

When added to a merchant's payment form, the JavaScript library automatically intercepts the payment form submission, sending payment information directly to the payment processor and converting it to a single-use token. The single-use token can be safely passed to the merchant's systems and used later to charge customers. Merchants have complete control of their customers' payment experience without ever handling processing or storing sensitive payment information.

Figure 5:
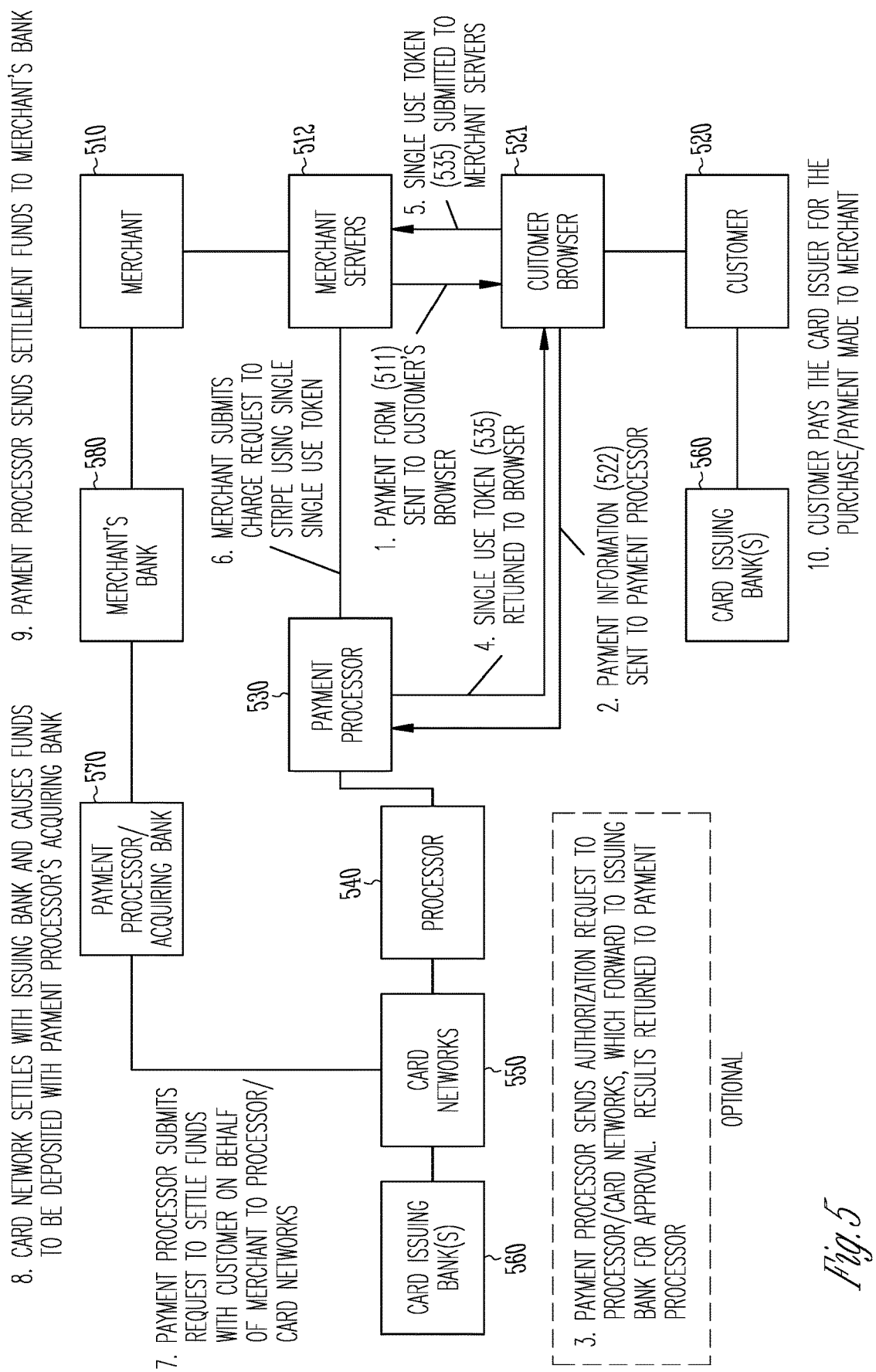
FIG. 5 is a block diagram showing aspects of an online method for conducting a transaction between a merchant site and an electronic user device using a payment processor, according to an example embodiment.

Viewed generally in one example, and with reference to FIG. 5, a payment processing flow is now described:

1. The merchant's customer 520 uses an Internet-enabled browser 521 to visit the merchant's site. The customer 520 is served a JavaScript library-enabled payment form 511 using standard web technologies. The customer 520 enters the specified information including their payment information 522 and submits the payment form 511. The billing info portion of the payment form 511 is for payment via a credit card or debit card. If payment is to be made via an ACH transaction, the billing info portion of the payment form 511 will request a bank routing number and an account number within that bank, and possibly additional information, such as the bank name and whether the account is a checking or savings account.

2. The customer's payment information 522 is sent from the customer's browser 521 to the payment processor 530, never touching the merchant servers 512. In this manner, the client-side application electronically sends payment information retrieved from the customer's electronic device to the payment processor 530. The client-side application does not send the payment information 522 to the server-side application.

3. In one preferred embodiment, the payment processor 530 submits the relevant transaction to a processor 540 or directly to the card network 550 for authorization or validation of the payment information. The card network 550 sends the request to the card issuing bank 560, which authorizes the transaction. In this embodiment, the payment processor 530 and the processor 540/card network 550 function together as a payment processor. In another example embodiment, this step is performed without any communication to the processor 540/card network 550. Instead, the payment processor 530 performs its own authorization or validation of the payment information using heuristic means, such as by checking the Bank Identification Number (BIN), also referred to as the Issuer Identification Number (IIN), against a database of known, valid BINs on file with the payment processor 530. (The BIN is a part of the bank card number, namely the first six digits.) In yet another example embodiment, this step is not performed at all since the authorization or validation is not necessary for the next step (4) to succeed. That is, it is acceptable to create a single-use token in step (4) that represents payment information which has not been validated in any way.

4. If authorized, the payment processor 530 will generate and return a secure, single-use token 535 to the customer's browser 521 that represents the customer's payment information but does not leak any sensitive information. In the example embodiment wherein step (3) is not performed, the payment processor 530 performs this step without waiting to receive authorization from the processor 540 or the card network 550. In this manner, the payment processor 530 creates the token 535 from the payment information sent by the client-side application, wherein the token 535 functions as a proxy for the payment information 522.

5. The payment form 511 is submitted to the merchant servers 512, including the single-use token 535. More specifically, the payment processor 530 sends the token 535 to the client-side application, which, in turn, sends the token 535 to the server-side application for use by the server-side application in conducting the transaction.

6. The merchant 510 uses the singe-use token 535 to submit a charge request to the payment processor 530 (or to create a customer object for later use). In this step, the payment processor 530 submits a request to authorize the charge to the processor 540 or directly to the card network 550. This authorization specifies the actual amount to charge the credit card. If an authorization was already done in step (3) for the correct amount, this authorization request can be skipped. This may be a one-time payment for a merchant item, or it may involve registering the payment information with the merchant site for subsequent use in making a payment for a merchant item (a so-called "card on file" scenario). Using the process described in steps (1) through (6), the payment information can be used by the server-side application via the token 535 without the server-side application being exposed to the payment information.

7. The payment processor 530 settles the charge on behalf of the merchant 510 with the processor 540 or directly with the card network 550.

8. The card network 550 causes the funds to be paid by the card issuing bank 560 to the payment processor 530 or to the payment processor's acquiring bank 570.

9. The payment processor 530 causes the settled funds to be sent to the merchant 510 (or to the merchant's bank 580), net of any applicable fees.

10. The card issuing bank 560 collects the paid funds from the customer 520.

Not all of the steps listed above need happen in real time. Other examples, arrangements, and functionality are possible. Applicant's published patent application US 2013/0117185 A1 is incorporated by reference in its entirety in this regard. Typically, when the merchant's customer submits the payment form in step (1), steps (1) through (6) happen in real time and steps (7) through (10) happen later, usually once per day, as a batch process settling all of the funds for all of the payment processor's merchants. In some examples, the payment processor uses an HTTP-based tokenization API in steps (2) and (4) above. Some broader examples may be considered as "tokenization as a service," in which any data is tokenized. One general example may facilitate a merger and acquisition (M&A) analysis in which companies want to compare an overlap in their customer bases. A payment processor (acting as a tokenization service) can tokenize the customers of each company and compare the overlap without revealing confidential information to either party. Unique payment tokens can be adapted to enable and facilitate such a tokenization service.

Aspects of the present disclosure use technical signals observable from the checkout page of a purchase transaction funnel to generate new data representative of inferences about a customer's experience in making a particular purchase. In some examples, the technical signals are observable exclusively from, or can only be extracted from, a checkout page of a purchase transaction funnel. In some examples, the data is extracted from novel sources and includes data previously denied to service providers as being too difficult or cumbersome to extract. The extracted new data can be structured and presented in novel ways to provide feedback to a merchant, for example, to improve technical services such as a checkout flow or payment experience. As described further above, conventional transactional systems have been blind to this data, or lacked the technology to access it.

Figure 6:
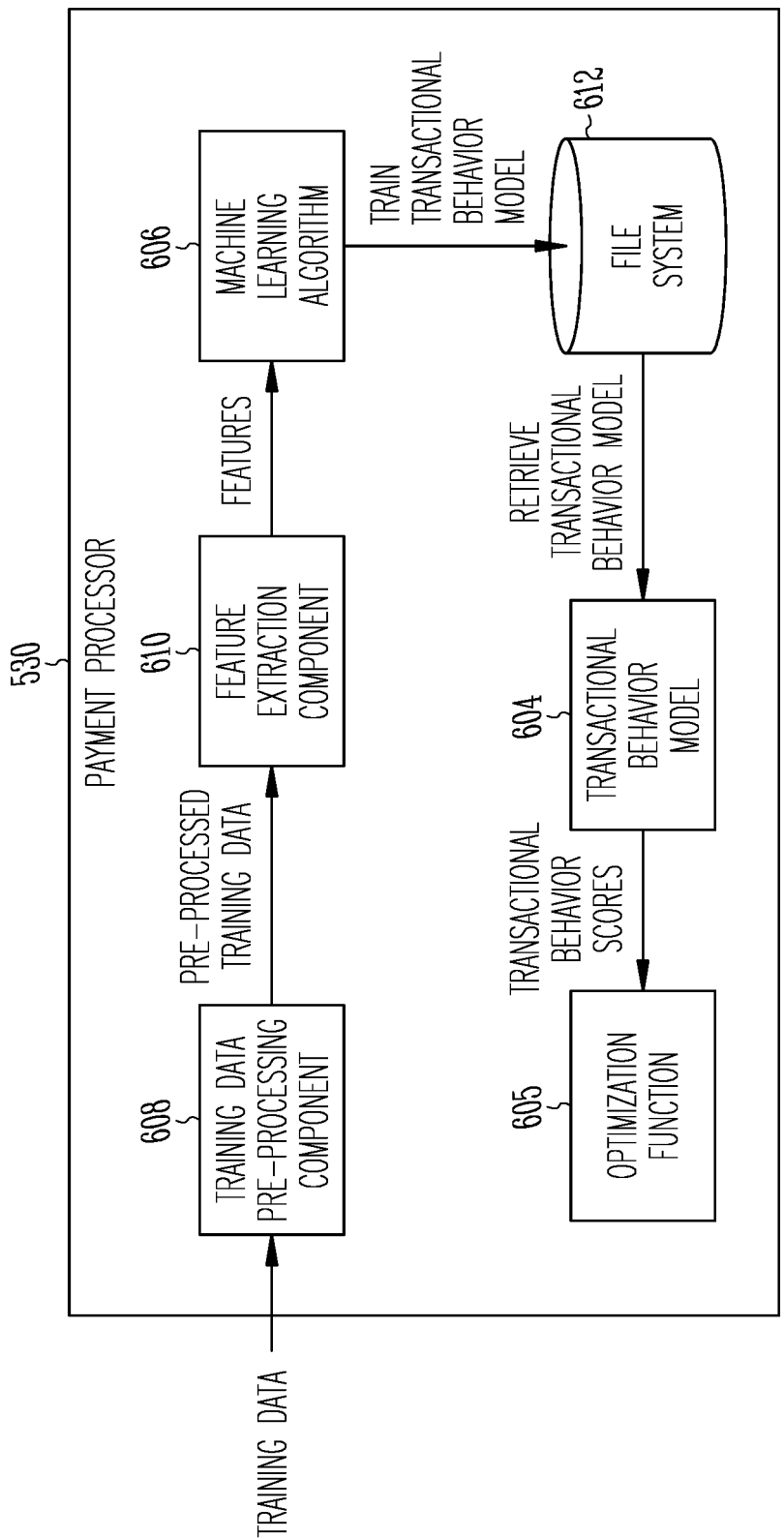
FIG. 6 is a block diagram illustrating an example payment processor, in accordance with an example embodiment.

FIG. 6 is a block diagram illustrating an example payment processor 530, in accordance with an example embodiment. Here, the example payment processor 530 includes a transactional behavior model 604. The transactional behavior model 604 acts to process and reprocess payments made through a checkout page in a purchase transaction funnel. In embodiments, the transactional behavior model 604 is trained based upon signals observed from the checkout page alone to predict, for example, a behavior of a purchaser (also termed a "customer" or "user" herein). Example predicted behaviors may include an action taken pursuant to a checkout user being dissatisfied with an aspect of a purchase transaction. Other predicted behaviors are possible, for example, an action taken pursuant to a user being satisfied with an aspect of the purchase transaction.

In some embodiments, a predicted behavior includes a user seeking a return or chargeback for a given purchase transaction. In some examples, a trained transactional behavior model 604 is built using historical merchant transaction data to predict, for a particular merchant for example, whether new transactions are likely to be satisfactory or not, as measured for example by whether a customer takes a negative user action such as seeking a refund, makes a chargeback in relation to a purchase transaction, or returns as a customer to the merchant. Other negative user actions are possible.

The transactional behavior model 604 may be trained via a machine learning algorithm 606. Specifically, training data may be obtained from a data source (not pictured) such as a checkout page in a purchase transaction funnel. In some example embodiments, the training data is initially stored in a Hadoop cluster and comprises information on previous purchase transactions from various customers and merchants. To the extent that such information is available, this training data can also include information on the customers and merchants themselves, such as, for example, their respective locations, merchant classifications, previous payment history, and the like.

In an example embodiment, the training data may comprise only information from payment attempts that result in a negative user action such as customer refunds, chargebacks, or returns. In a further example embodiment, each piece of training data may contain two sections in a specific data structure: a first customer (or user) interaction section and a second checkout page data section, as well as a label indicating whether a given purchase transaction was successful or not, based on one or more criteria.

In some examples, the first customer interaction section contains data relating to any interaction attribute relevant to the conclusion of a successful or unsuccessful purchase transaction. Example interaction attributes may include those listed below:

| Interaction Attribute Table | |
|---|---|
| Attribute 1 | A time period between the loading of a checkout page and the taking or completion of a payment action. A payment action may include one or more of a completion or part completion of a payment form presented in the checkout page, completing a transaction, making a payment submission, and making a submission of a payment page |
| Attribute 2 | A number of times a customer viewed a checkout page before taking or completing a payment action |
| Attribute 3 | A number of typos or other field mis-entries requiring correction prior to taking or completing a payment action |
| Attribute 4 | A detection of whether the customer omitted any required fields as part of his or her initial purchase attempt that needed to be corrected prior to taking or completing a payment action |
| Attribute 5 | A number, type, and frequency of mouse movements |
| Attribute 6 | A detection of whether a payment instrument was declined |
| Attribute 7 | A detection of whether a customer switched to a different payment instrument to complete the transaction |
| Attribute 8 | A purchase transaction location (generally, from reverse IP lookup) and, relatedly, a local time at which the purchase transaction occurred |

In some examples, the checkout page data section contains any checkout page attribute relevant to the conclusion of a successful or unsuccessful purchase transaction. Example checkout page attributes may include those listed below:

| Checkout Page Attributes | |
|---|---|
| Attribute 1 | A detection of whether a customer is a first-time customer or repeat customer. (An inference may be drawn on the basis that repeat customers are more likely to be satisfied with a given merchant user, while this does not necessarily follow for new customers.) |
| Attribute 2 | If a repeat customer is detected, a time period elapsed since a prior transaction relative to a customer average. (An inference may be drawn on the basis of perceived customer reliability relative to other existing customers.) |
| Attribute 3 | A basket size of the transaction relative to a customer's average basket size. (An inference regarding customer sentiment may be drawn based on whether this is an atypically sized order for this type of merchant.) |
| Attribute 4 | A purchase time for a location relative to a customer's average purchase time in that location. (An inference regarding customer sentiment or convenience may be drawn based on whether this purchase is made at an atypical time of day for this location or type of good.) |
| Attribute 5 | A payment instrument (e.g., a credit card) locality and currency to give an indication of a customer's location relative to the merchant. |
| Attribute 6 | Information from customer orders or shipping API data. (For example, a checkout cart containing multiple sizes of the same clothing product may indicate that the customer is insecure about a product fit and more likely to return all but one of them. A selected speed of shipping, for example next-day FedEx vs. USPS, may also be indicative of customer agitation or an expected dissatisfaction with an aspect of a purchase transaction.) |
| Attribute 7 | A detection of whether a purchase transaction resulted in a chargeback. (Chargebacks generally include more embedded metadata, and a type of chargeback can be determined. Chargebacks are an extremely strong signal that a customer was unhappy with an aspect of a purchase transaction.) |
| Attribute 8 | A detection of whether a purchase transaction resulted in a refund. (A refund is an extremely strong signal that a customer was unhappy with an aspect of a purchase transaction.) |

| Checkout Page Attributes | |
|---|---|
| Attribute 9 | A detection of whether a purchase transaction resulted in a subsequent support ticket or request. (A support ticket can signal that a customer was unhappy with an aspect of a purchase transaction.) |
| Attribute 10 | Customer review data. |

A training data preprocessing component 608 may preprocess the training data, including for example, applying a MapReduce function or similar functionality to the training data. A feature extraction component 610 may then act to extract a plurality of features from the preprocessed training data and feed these features into the machine learning algorithm 606. The extracted features may relate to one or more of the inferences discussed above. The machine learning algorithm 606 learns weights assigned to each of the features and applies these weights to a function. The function and the learned weights comprise the machine-learned transactional behavior model 604, which may be stored in a file system 612 and retrieved when needed to perform analysis of a candidate purchase transaction at various potential transaction times or under various purchase transaction conditions.

The machine learning algorithm 606 may be selected from among many different potential supervised or unsupervised machine learning algorithms. Examples of supervised machine learning algorithms include artificial neural networks, Bayesian networks, instance-based learning support vector machines, random forests, linear classifiers, quadratic classifiers, k-nearest neighbor, decision trees, and hidden Markov models. Examples of unsupervised machine learning algorithms include expectation-maximization algorithms, vector quantization, and information bottleneck methods. In an example embodiment, a binary logistic regression model is used. Binary logistic regression deals with situations in which the observed outcome for a dependent variable can have only two possible types. Logistic regression is used to predict the odds of one case or the other being true based on values of independent variables (predictors). In a further example embodiment, a boosted tree gradient descent process is utilized for the machine learning.

The function contained in the transactional behavior model 604 may be evaluated at runtime to produce a transactional behavior score. The transactional behavior score is a prediction of the likelihood that an attempted purchase transaction will result in a successful (or unsuccessful) payment (i.e., invoke a positive user action) or invoke a negative user action, based on evaluating various features and applying the feature weights learned by the machine learning algorithm 606 to the features. In some examples, a predicted transaction may include a hybrid result, for example result in both a successful payment and a negative user action (e.g., a complaint, or a bad review, and so forth).

In other aspects, transactional behavior scores can be input as data into an optimization function 605 to dynamically optimize or change a checkout page (user interface) to maximize or at least increase a probability of purchase transaction success, i.e., positive user action. Said another way, the checkout page is dynamically optimized to reduce the probability of a negative user action in relation to a given purchase transaction. In an example embodiment, the transactional behavior score is optimized at evaluation time in accordance with the optimization function 605. This optimization function 605 acts to optimize the transactional behavior score such that the output of the transactional behavior model 604 not only maximizes, or at least increases, a likelihood that a purchase transaction will be processed successfully, but also minimizes, or at least reduces, a likelihood of customer dissatisfaction, or negative user action.

In some examples, a predicted customer sentiment may be determined dynamically at checkout. That is, the predicted sentiment or behavior of customers over a period of time (for example, a day or a week) can be used in some examples as a fitness function for a genetic-algorithm-based optimizer (for example, the optimization function 605) to dynamically change the type, layout, or other aspects of a checkout page presented in a user interface to increase a probability of transaction success and assess a predicted sentiment or behavior of customers making transactions.

In still other practical aspects, the improved technology allows data representing predicted user behavior or sentiment based on customer transactions to be used as an input to upsell or provide offers to customers. In other practical examples, customers who have completed transactions but nevertheless were predicted to be unsatisfied can be targeted specifically with offers, bonuses, or other incentives as a way to reduce the likelihood of a refund, chargeback, or bad net promoter score (NPS). In still other aspects, a merchant can be provided with information about their average customer transactional behavior score relative to an anonymized set of peer companies, such that the merchant can choose to make changes to their checkout experience to increase customer transaction satisfaction.

In each of the embodiments described herein, a client device 108 may be configured, or caused to be configured, by a payment processor 530, or an operating system such as iOS or Android, to execute the operations or provide the checkout page functionality described herein.

Thus, in some embodiments, a system for processing electronic payments is provided. An example system may comprise a network; one or more hardware processors; and a memory storing instructions that, when executed by at least one processor among the processors, cause the scheduling system to perform operations comprising at least: obtaining training data from a data source, the training data relating to prior purchases made via the electronic payment processing system, the data source including a checkout page in a purchase transaction funnel; extracting one or more features from the training data relating to the prior purchases, the one or more features associated with a negative user action invoked in relation to at least one of the prior purchases; for each of a plurality of real-time purchases, feeding the one or more extracted features into a transactional behavior model, the transactional behavior model trained via a machine learning algorithm to produce a transactional behavior score indicative of a probability that a first real-time purchase among the plurality of real-time purchases will invoke a negative user action taken in relation to the first real-time purchase; using one or more transactional behavior scores for the plurality of real-time purchases to predict respective occurrences of invoked negative user action; and based on the predicted occurrences, dynamically optimizing the checkout page in the purchase transaction funnel to reduce a probability that a second real-time purchase among the plurality of real-time purchases will invoke a negative user action taken in relation to the second real-time purchase.

Figure 7:
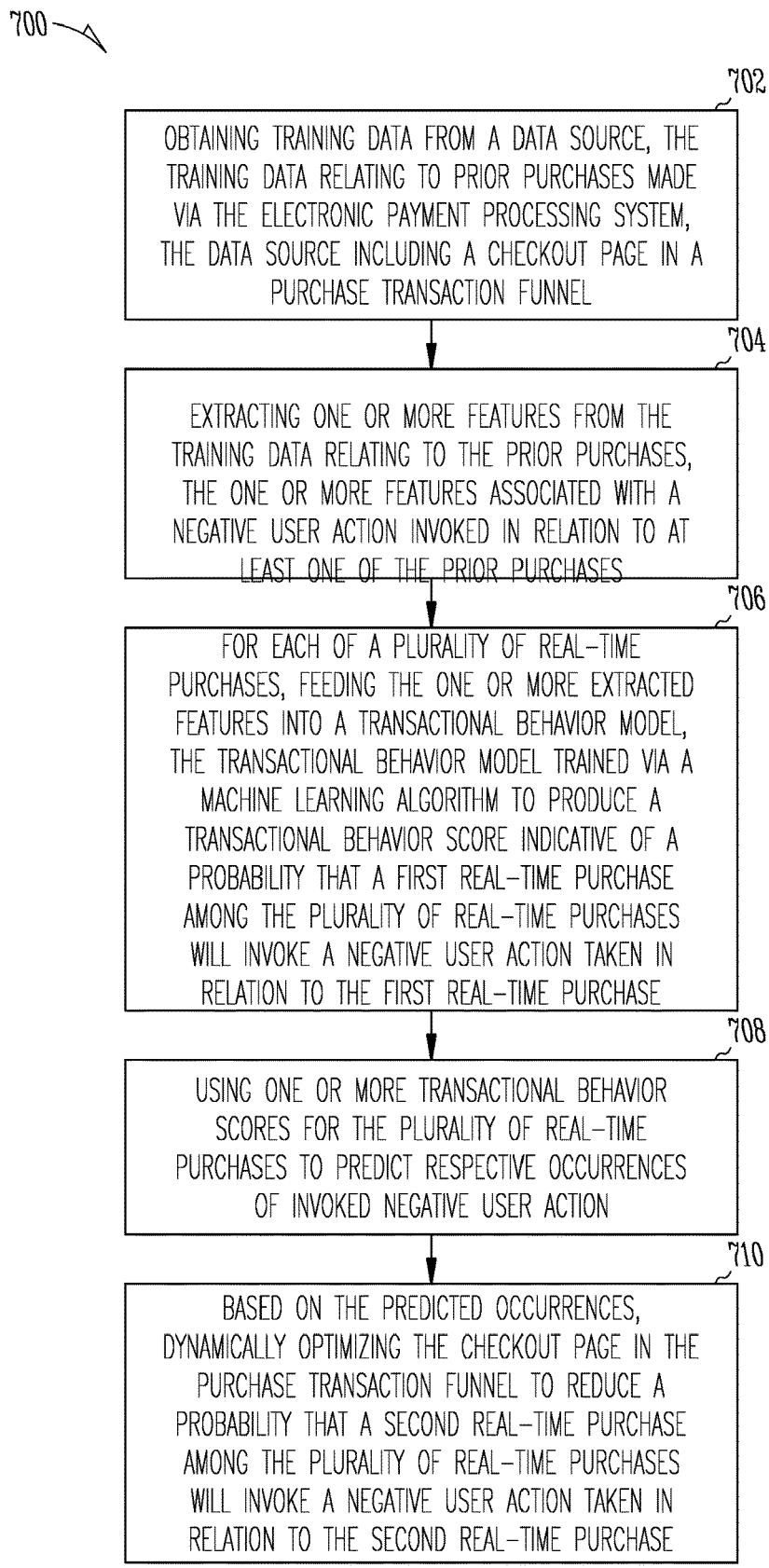
FIG. 7 is a flow diagram illustrating a method, in accordance with an example embodiment.

Embodiments of the present disclosure include methods. FIG. 7 is a flow diagram illustrating an example method 700, for processing payments made via an electronic payment processing system in accordance with an example embodiment. The method 700 includes, at operation 702, obtaining training data from a data source, the training data relating to prior purchases made via the electronic payment processing system, the data source including a checkout page in a purchase transaction funnel; at operation 704, extracting one or more features from the training data relating to the prior purchases, the one or more features associated with a negative user action invoked in relation to at least one of the prior purchases; at operation 706, for each of a plurality of real-time purchases, feeding the one or more extracted features into a transactional behavior model, the transactional behavior model trained via a machine learning algorithm to produce a transactional behavior score indicative of a probability that a first real-time purchase among the plurality of real-time purchases will invoke a negative user action taken in relation to the first real-time purchase; at operation 708, using one or more transactional behavior scores for the plurality of real-time purchases to predict respective occurrences of invoked negative user action; and, at operation 710, based on the predicted occurrences, dynamically optimizing the checkout page in the purchase transaction funnel to reduce a probability that a second real-time purchase among the plurality of real-time purchases will invoke a negative user action taken in relation to the second real-time purchase.

In some examples, the data source is confined to data contained in or associated with the checkout page in the purchase transaction funnel.

In some examples, the invoked negative user action includes one or more of a refund request, a chargeback request, and a return request.

In some examples, the operations further comprise confining the training data to information extracted from the checkout page and associated with the invoked negative user action.

In some examples, the training data includes a data structure, the data structure including a first user interaction section and a second checkout page data section.

In some examples, the first user interaction section includes data sourced exclusively from the checkout page and relating to one or more of: a time period between a loading of the checkout page and a taking or completion of a payment action; a number of times or frequency a customer viewed the checkout page before taking or completing a payment action; a number of typos or other mis-entries corrected prior to taking or completing a payment action; a detection of an omitted field completed prior to taking or completing a payment action; a number, type, or frequency of a mouse movement; a detection of a payment denial; a detection of a decline of a payment instrument; a detection of a substitution of the payment instrument; an IP address associated with a prior purchase, the first real-time purchase, or the second real-time purchase; and a local user time of the prior purchase, the first real-time purchase, or the second real-time purchase.

In some examples, the second checkout page data section includes data sourced exclusively from the checkout page and relating to one or more of: a detection of a first-time customer; a detection of a repeat customer; a time period of an interval between a prior purchase and the first real-time or second real-time purchase, assessed relative to a customer average for the same interval; a user cart size associated with the prior purchase and the first real-time or second real-time purchase, assessed relative to an average user cart size for a respective purchase; a locality or default currency of a payment instrument assessed relative to a locality or currency of a merchant store or website; user order or shipping API data; a selection of a shipping service or shipping rate; a degree of embedded metadata associated with a user action; a detection of a refund; a detection of a support ticket or request; and user review data.

Some embodiments include machine-readable media including instructions which, when read by a machine, cause the machine to perform the operations of any one or more of the methodologies summarized above, or described elsewhere herein.

Although the subject matter has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Description, therefore, is not to be taken in a limiting sense, and the scope of various embodiments is defined only by any appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method for processing payments made via an electronic payment processing system, the method comprising:
obtaining training data from a data source, the training data relating to prior purchases made via the electronic payment processing system, the data source including, for each of the prior purchases, a checkout page of a purchase transaction presented by a device user interface of the electronic payment system in a check out flow of each of the prior purchases;
extracting one or more features from the training data relating to the prior purchases, the one or more features associated with a negative user action invoked in relation to at least one of the prior purchases;
for a real-time purchase not included in the training data, the real-time purchase transacted at a real-time device user interface rendered by the electronic payment system presenting a real-time check out page in a check out flow, feeding the one or more extracted features into a transactional behavior model, the transactional behavior model trained via a machine learning algorithm to produce a transactional behavior score indicative of a probability that the real-time purchase will invoke a negative user action taken by the user pursuant to a conclusion of the real-time purchase;

for the real-time purchase, and based on the transactional behavior score and user data entered during the real-time purchase, causing a dynamic optimization, during the check out flow, of the real-time device user interface presenting the checkout page, the dynamic optimization of the real-time device user interface including insertion in the real-time check out page of a targeted remedial action, specific to the user, to reduce a probability that the real-time purchase will invoke a negative user action taken pursuant to a conclusion of the real-time purchase;

receiving, via the real-time device user interface, a request to invoke the remedial action; and in response to receiving the request to invoke the remedial action, triggering the remedial action to be invoked.

2. The method of claim 1, wherein the data source is confined to data contained in or associated with the checkout page in the purchase transaction funnel.

3. The method of claim 2, wherein the invoked negative user action includes one or more of a refund request, a chargeback request, and a return request.

4. The method of claim 3, further comprising confining the training data to information extracted from the checkout page and associated with the invoked negative user action.

5. The method of claim 1, wherein the training data includes a data structure, the data structure including a first user interaction section and a checkout page data section.

6. The method of claim 5, wherein the first user interaction section includes data sourced exclusively from the checkout page and relating to one or more of:
- a time period between a loading of the checkout page and a taking or completion of a payment action;
- a number of times or frequency a customer viewed the checkout page before taking or completing a payment action;
- a number of typos or other mis-entries corrected prior to taking or completing a payment action;
- a detection of an omitted field completed prior to taking or completing a payment action;
- a number, type, or frequency of a mouse movement;
- a detection of a payment denial;
- a detection of a decline of a payment instrument;
- a detection of a substitution of the payment instrument;
- an IP address associated with a prior purchase or the real-time purchase; and
- a local user time of the prior purchase or the real-time purchase.

7. The method of claim 5, wherein the checkout page data section includes data sourced exclusively from the checkout page and relating to one or more of:
- a detection of a first-time customer;
- a detection of a repeat customer;
- a time period of an interval between a prior purchase and the real-time purchase, assessed relative to a customer average for the same interval;
- a user cart size associated with the real-time purchase, assessed relative to an average user cart size for a purchase;
- a locality or default currency of a payment instrument to give an indication of a customer's location relative to a merchant;
- user order or shipping API data;
- a selection of a shipping service or shipping rate;
- embedded metadata associated with a user action;
- a detection of a refund; and
- a detection of a support ticket or request.

8. A system for processing electronic payments, the system comprising:

at least one processor; and a memory storing instructions that, when executed by the at least one processor, cause the system to perform operations comprising, at least:

obtaining training data from a data source, the training data relating to prior purchases made via the electronic payment processing system, the data source including, for each of the prior purchases, a checkout page of a purchase transaction presented by a user interface of the electronic payment system in a check out flow of each of the prior purchases;

extracting one or more features from the training data relating to the prior purchases, the one or more features associated with a negative user action invoked in relation to at least one of the prior purchases;

for a real-time purchase not included in the training data, the real-time purchase transacted at a real-time user interface of the electronic payment system presenting a real-time check out page in a check out flow, feeding the one or more extracted features into a transactional behavior model, the transactional behavior model trained via a machine learning algorithm to produce a transactional behavior score indicative of a probability that the real-time purchase will invoke a negative user action taken by the user pursuant to a conclusion of the real-time purchase;

and for the real-time purchase, and based on the transactional behavior score, causing a dynamic optimization, during the check out flow, of the real-time user interface presenting the checkout page, the dynamic optimization including insertion in the real-time check out page of a targeted remedial action, specific to the user, to reduce a probability that the real-time purchase will in fact invoke a negative user action taken pursuant to a conclusion of the real-time purchase.

9. The system of claim 8, wherein the data source is confined to data contained in or associated with the checkout page in the purchase transaction funnel.

10. The system of claim 8, wherein the invoked negative user action includes one or more of a refund request, a chargeback request, and a return request.

11. The system of claim 10, wherein the operations further comprise confining the training data to information extracted from the checkout page and associated with the invoked negative user action.

12. The system of claim 8, wherein the training data includes a data structure, the data structure including a first user interaction section and a checkout page data section.

13. The system of claim 12, wherein the first user interaction section includes data sourced exclusively from the checkout page and relating to one or more of:
- a time period between a loading of the checkout page and a taking or completion of a payment action;
- a number of times or frequency a customer viewed the checkout page before taking or completing a payment action;
- a number of typos or other mis-entries corrected prior to taking or completing a payment action;
- a detection of an omitted field completed prior to taking or completing a payment action;
- a number, type, or frequency of a mouse movement;
- a detection of a payment denial;

a detection of a decline of a payment instrument;
a detection of a substitution of the payment instrument;
an IP address associated with a prior purchase or the real-time purchase; and
a local user time of the prior purchase or the real-time purchase.

14. The system of claim 12, wherein the checkout page data section includes data sourced exclusively from the checkout page and relating to one or more of:
a detection of a first-time customer;
a detection of a repeat customer;
a time period of an interval between a prior purchase and the real-time purchase, assessed relative to a customer average for the same interval;
a user cart size associated with the real-time purchase, assessed relative to an average user cart size for a purchase;
a locality or default currency of a payment instrument to give an indication of a customer's location relative to a merchant;
user order or shipping API data;
a selection of a shipping service or shipping rate;
embedded metadata associated with a user action;
a detection of a refund; and
a detection of a support ticket or request.

15. A non-transitory machine-readable medium comprising instructions which, when read by a machine, cause the machine to perform operations for processing payments made via an electronic payment processing system, the operations comprising, at least:
obtaining training data from a data source, the training data relating to prior purchases made via the electronic payment processing system, the data source including, for each of the prior purchases, a checkout page of a purchase transaction presented by a user interface of the electronic payment system in a check out flow of each of the prior purchases;
extracting one or more features from the training data relating to the prior purchases, the one or more features associated with a negative user action invoked in relation to at least one of the prior purchases;
for a real-time purchase not included in the training data, the real-time purchase transacted at a real-time user interface of the electronic payment system presenting a real-time check out page in a check out flow, feeding the one or more extracted features into a transactional behavior model, the transactional behavior model trained via a machine learning algorithm to produce a transactional behavior score indicative of a probability that the real-time purchase will invoke a negative user action taken by the user pursuant to a conclusion of the real-time purchase;
and
for the real-time purchase, and based on the transactional behavior score, causing a dynamic optimization, during the check out flow, of the real-time user interface presenting the checkout page, the dynamic optimization including insertion in the real-time check out page of a targeted remedial action, specific to the user, to reduce a probability that the real-time purchase will in fact invoke a negative user action taken pursuant to a conclusion of the real-time purchase.

16. The medium of claim 15, wherein the data source is confined to data contained in or associated with the checkout page in the purchase transaction funnel.

17. The medium of claim 15, wherein the invoked negative user action includes one or more of a refund request, a chargeback request, and a return request.

18. The medium of claim 17, wherein the operations further comprise confining the training data to information extracted from the checkout page and associated with the invoked negative user action.

19. The medium of claim 15, wherein the training data includes a data structure, the data structure including a first user interaction section and a first checkout page data section.

20. The medium of claim 19, wherein the first user interaction section includes data sourced exclusively from the checkout page and relating to one or more of:
a time period between a loading of the checkout page and a taking or completion of a payment action;
a number of times or frequency a customer viewed the checkout page before taking or completing a payment action;
a number of typos or other mis-entries corrected prior to taking or completing a payment action;
a detection of an omitted field completed prior to taking or completing a payment action;
a number, type, or frequency of a mouse movement;
a detection of a payment denial;
a detection of a decline of a payment instrument;
a detection of a substitution of the payment instrument;
an IP address associated with a prior purchase or the real-time purchase; and
a local user time of the prior purchase or the real-time purchase.

* * * * *